US012499477B2

(12) United States Patent
Muniganti et al.

(10) Patent No.: US 12,499,477 B2
(45) Date of Patent: Dec. 16, 2025

(54) SYSTEMS AND METHODS FOR PREGENERATING STATES FOR ITEMS

(71) Applicant: Walmart Apollo, LLC, Bentonville, AR (US)

(72) Inventors: Vinay Muniganti, San Jose, CA (US); Sandeep Singh, Sunnyvale, CA (US); Ravi Rastogi, Santa Clara, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 365 days.

(21) Appl. No.: 16/989,138

(22) Filed: Aug. 10, 2020

(65) Prior Publication Data

US 2021/0049662 A1 Feb. 18, 2021

Related U.S. Application Data

(60) Provisional application No. 62/889,405, filed on Aug. 20, 2019, provisional application No. 62/885,738, filed on Aug. 12, 2019.

(51) Int. Cl.
*G06Q 30/00* (2023.01)
*G06Q 30/0235* (2023.01)
*G06Q 30/0601* (2023.01)

(52) U.S. Cl.
CPC ..... *G06Q 30/0623* (2013.01); *G06Q 30/0235* (2013.01); *G06Q 30/0641* (2013.01)

(58) Field of Classification Search
USPC ..................................................... 705/26.61
See application file for complete search history.

(56) References Cited

U.S. PATENT DOCUMENTS 6,961,712 B1 11/2005 Perkowski
8,326,703 B2 12/2012 Peter
8,521,586 B2 8/2013 Angles
(Continued)

OTHER PUBLICATIONS

V.A. Siris, X. Vasilakos and G. C. Polyzos, Efficient proactive caching for supporting seamless mobility, 2014, Proceeding of IEEE International Symposium on a World of Wireless, Mobile and Multimedia Networks 2014, pp. 1-6. (Year: 2014).*

(Continued)

*Primary Examiner* — Kelly S. Campen
*Assistant Examiner* — Brittany E Bargeon
(74) *Attorney, Agent, or Firm* — Foley IP Law, PLLC

(57) ABSTRACT

In some embodiments, apparatuses and methods are provided herein useful to providing item information to customers. In some embodiments, a system for providing item information to customers in an online retail environment comprises a data store configured to store states of items, a user device, and a control circuit configured to receive, from backend systems, nonevent item information for a first item including pricing associated with a nonevent for the first item, receive from the backend systems, event item information for the first item including pricing information associated with an event for the first item and temporal information associated with the event, pregenerate, based on the nonevent item information, a nonevent state of the first item, pregenerate, based on the event item information, an event state of the first time, and transmit, for storage in the data store, the nonevent and event states of the first item.

17 Claims, 3 Drawing Sheets

(56) References Cited

U.S. PATENT DOCUMENTS

| | | | |
|---|---|---|---|
| 9,294,822 B2 | 3/2016 | Mclauchlan | |
| 9,443,260 B2 | 9/2016 | Chan | |
| 9,684,914 B1* | 6/2017 | Porter | G06Q 30/0611 |
| 10,657,558 B1* | 5/2020 | Lindsay | G06Q 30/0277 |
| 2003/0033355 A1* | 2/2003 | Saunders | H04B 7/18515 |
| | | | 709/231 |
| 2003/0092421 A1* | 5/2003 | Dolwin | H04W 8/04 |
| | | | 455/403 |
| 2003/0182184 A1 | 9/2003 | Strasnick | |
| 2009/0276364 A1* | 11/2009 | Iaia | G06Q 40/12 |
| | | | 705/26.1 |
| 2012/0311651 A1* | 12/2012 | Kahn | H04N 21/23805 |
| | | | 725/116 |
| 2020/0065424 A1* | 2/2020 | Ananthapur Bache | G06N 3/08 |

OTHER PUBLICATIONS

IBM; "Planning and Managing the Deployment of WebSphere Commerce"; http://www.redbooks.ibm.com/redbooks/pdfs/sg247588.pdf; Jun. 9, 2008; pp. 1-430.

Oracle; "Commerce Programming Guide"; https://docs.oracle.com/cd/E55783_02/Platform.11-2/ATGCommProgGuide/ATGCommProgGuide.pdf; Oct. 22, 2015; pp. 1-870.

* cited by examiner

SYSTEMS AND METHODS FOR PREGENERATING STATES FOR ITEMS

CROSS-REFERENCE TO RELATED APPLICATION

This application claims the benefit of U.S. Provisional Application No. 62/889,405, filed Aug. 20, 2019, and U.S. Provisional Application No. 62/885,738, filed Aug. 12, 2019, which are incorporated by reference in their entirety herein.

TECHNICAL FIELD

This invention relates generally to websites and, more particularly, serving content for websites.

BACKGROUND

While shopping online can be convenient for customers and provide retailers with additional retail channels, online shopping presents problems that are different than those encountered in a brick-and-mortar retail facility. For example, during extremely high traffic periods, servers can be overwhelmed, causing websites to fail to function properly, or be accessible to customers. These high traffic periods are often related to promotional events in which items are offered for a discounted price. Some retailers attempt to control the flow of traffic by staggering the times at which discounts begin. For example, if a promotional event begins at midnight, the retailer may begin discounts for ten items at midnight, an additional twenty items an hour later, and so on. While this approach can help control traffic spikes, it is not optimal as it doesn't address the cause of the problem—how to handle traffic spikes. Rather, current solutions seek to address the problem by decreasing the likelihood of a large traffic spike. Consequently, a need exists for better systems, methods, and apparatuses to handle traffic spikes on retail websites.

BRIEF DESCRIPTION OF THE DRAWINGS

Disclosed herein are embodiments of systems, apparatuses and methods pertaining to providing item information to customers in an online retail environment. This description includes drawings, wherein.

Figure 1:
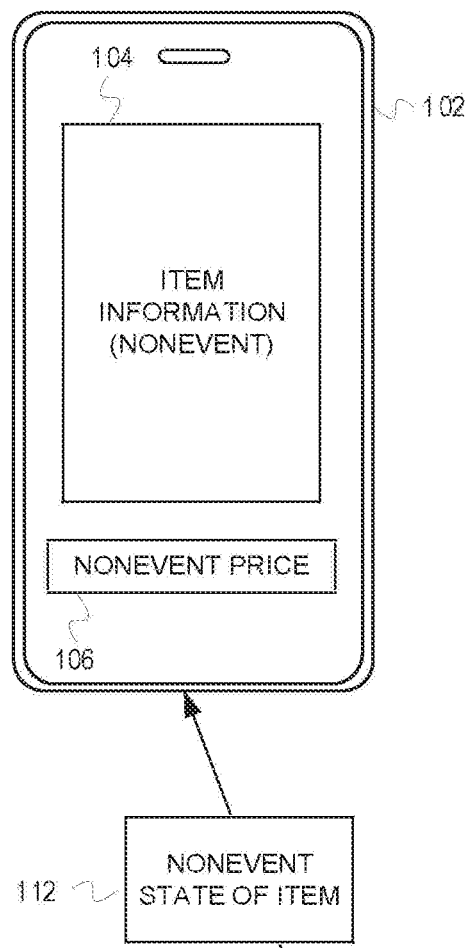
FIG. 1 depicts a first mobile device 102 and a second mobile device 114 requesting item information, according to some embodiments.
Figure 1:
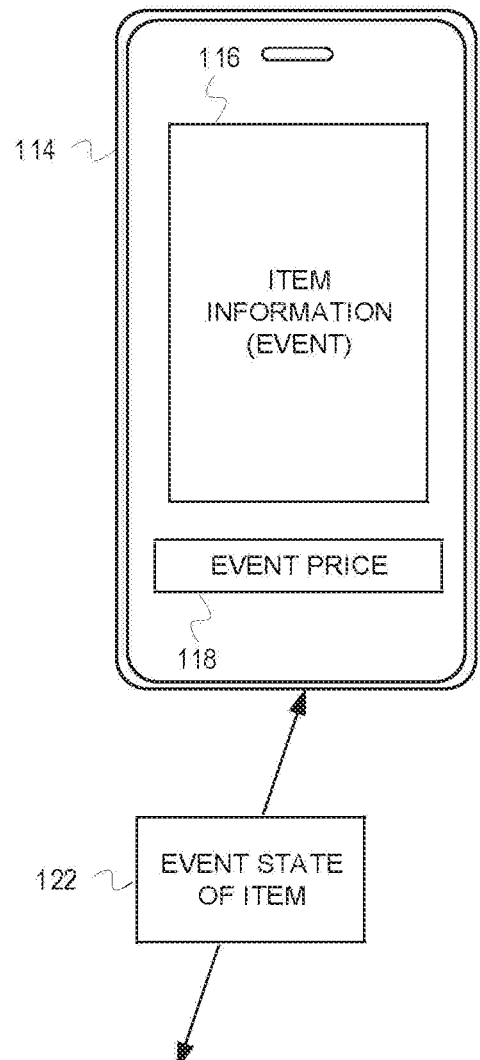
Figure 1:
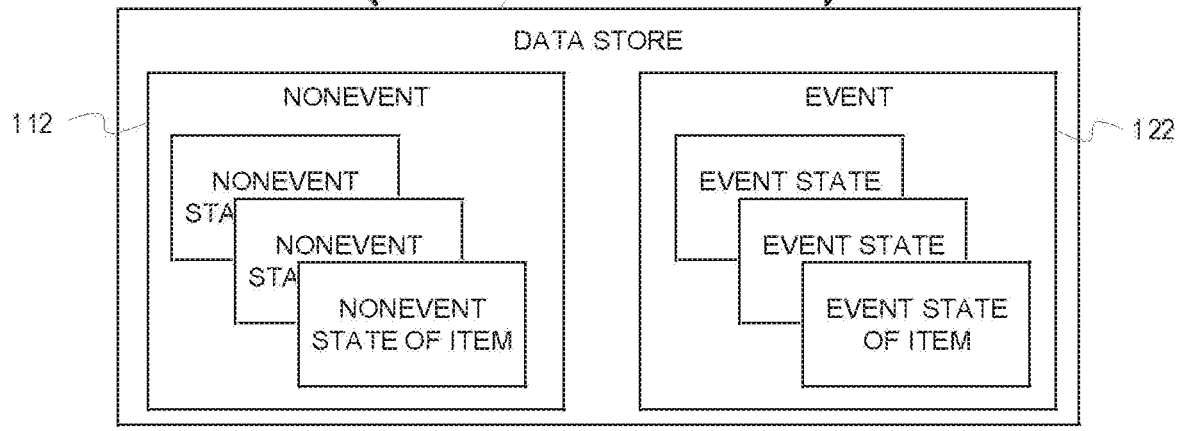

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses, and methods are provided herein useful to providing item information to customers in an online retail environment. In some embodiments, a system for providing item information to customers in an online retail environment comprises a data store, wherein the data store is configured to store states of items, wherein the items are offered for sale online, a user device, wherein the user device comprises a user input device, wherein the user input device is configured to receive customer input to select a selected item, and a transceiver, wherein the transceiver is configured to transmit an indication of the selected item and receive item information associated with the selected item, and a control circuit, wherein the control circuit is communicatively coupled to the data store and the user device, and wherein the control circuit is configured to receive, from backend systems, nonevent item information for a first item, wherein the nonevent item information includes pricing associated with a nonevent for the first item, receive from the backend systems, event item information for the first item, wherein the event item information includes pricing information associated with an event for the first item and temporal information associated with the event, pregenerate, based on the nonevent item information, a nonevent state of the first item, pregenerate, based on the event item information, an event state of the first time, and transmit, for storage in the data store, the nonevent state of the first item and event state of the first item.

As previously discussed, while shopping online can be convenient for customers and provide retailers with additional retail channels, online shopping often presents problems that are different than those encountered in a brick-and-mortar retail facility. One of these problems relates to handling traffic volume. Brick-and-mortar retail facilities frequently have a specific capacity (e.g., set by a fire marshal based on characteristics of the facility). The capacity limits the number of customers that can shop in the retail facility at any given time. During promotional events (e.g., product launches, holiday shopping events, sales events, etc.), lines can form at retail facilities. If the retail facility is at capacity, customers must wait in the line and enter only when another customer exits. Websites don't have physical capacities and do not scale well, even when additional capacity is added. If online traffic is not throttled or otherwise controlled, websites can become overloaded and can crash, even if additional capacity is added.

When a customer visits a websites to view a product, the customer's device (e.g., a computer, smartphone, tablet, etc.) requests item information from a webserver. Typically, webservers store item information in caches. That is, item information is cached for easy retrieval for the customer's device. However, if item information for an item is not cached, the webserver may need to make calls to several backend systems to retrieve the item information. For example, the webserver may need to make calls to a pricing system, an inventory system, an item file system, etc. to retrieve all of the necessary information. Because these calls are time-consuming and data intensive, once the item information is retrieved it is cached for access by other users. Because the item information is cached, when subsequent users request the calls to the other services can be avoided, thus improving the functionality of the website.

During a promotional event, prices for multiple products may change (e.g., the price on a large number of products may be discounted). When the price changes for a product, the item information stored in the cache becomes stale (e.g., no longer current, accurate, etc.). Because the item information in the cache is stale, the webserver must make calls to other backend systems to retrieve the item information. If a large number of customers are requesting the item information in a short period of time (e.g., near the time of the start of an event), the webserver will attempt to make calls to the backend systems for each of the requests. It is easy to see how, during a highly anticipated sale of product launch, this large number of calls could cause the website to become overloaded and crash.

Embodiments of the inventive subject matter seek to eliminate, or at least minimize, the number of calls to backend systems during promotional events. In one embodiment, the system pregenerates states of items. The states of the items include the item information that is necessary to present the item on a user's device. The system pregenerates the states in that the states are generated before a user requests the information. The states are then cached for easy retrieval (i.e., retrieval of item information with no, or few, backend system calls). Additionally, in some embodiments, the system pregenerates multiple states for each item. For example, if Item X is scheduled to have a promotional price on Aug. 7, 2019, the system pregenerates a state for Item X that is valid before Aug. 7, 2019 (i.e., a nonevent or prevent state) and a state for Item X that is valid on Aug. 7, 2019 (i.e., an event state). The system caches both the nonevent state and the event state. When a user device requests the item information for Item X, the state of Item X that is associated with the timing of the request is used to provide the user device with the item information for Item X. That is, if the user device requests the item information for Item X before Aug. 7, 2019, the system provides the user device with the nonevent state of Item X. Similarly, if the user device requests the item information for Item X on Aug. 7, 2019, the system provides the user device with the event state of Item X. Because the system pregenerates and caches multiple states of each item, when the event begins the state of the items with the event characteristics are already prepared and cached for easy retrieval by the user devices, limiting the number of calls that must be made to backend systems. Additionally, in some embodiments, because the event states of items are already cached, there is little or no delay between the time an event begins and the time that the item information reflected on the website represents the item information for the event. The discussion of FIG. 1 provides an overview of such a system.

FIG. 1 depicts a first mobile device 102 and a second mobile device 114 requesting item information, according to some embodiments. The first mobile device 102 and second mobile device 114 are requesting the same item information (i.e., item information for the same item). However, the first mobile device 102 is requesting the item information before an event (e.g., a promotional event), also referred to as a "nonevent," and the second mobile device 114 is requesting item information during the event. Accordingly, the first mobile device 102 presents nonevent item information 104 and the second mobile device 114 presents event item information 116.

The item information varies dependent upon whether it is a nonevent or an event. For example, the price of the item may be different during the nonevent and the event (e.g., the price for the item may be lower during the event than during the nonevent). In this case, the first mobile device 102 presents a nonevent price 106 and the second mobile device 114 presents an event price 120. As another example, the availability of the item may be different between the event and the nonevent. For example, in the case of a product launch, the item may not be available until the event. In this case, the nonevent item information 104 may be a description of the item or a press release for the item, whereas the event item information 116 may include an option to purchase the item.

As previously discussed, states of items are pregenerated for the items. The states are pregenerated in that they are generated before a request for the item information is received. For example, in the case of a promotional event, the states can be generated before the promotional event begins. The states of the items are stored in a data store 110. The data store 110 can include a database (e.g., relational database, a NOSQL database) and/or a cache. In any event, the data store 110 stores nonevent states 112 as well as event states 122. The data store 110 also stores trigger information for the nonevent states 112 and/or the event states 122. The trigger information indicates which of the states should be used to provide the item information to a customer. For example, if the status of nonevent and event are based on timing (e.g., a date, hour of the day, day of the week, etc.), the trigger information can be temporal information. As one example, if the event is a sales event that occurs on every Friday, the data store 110 can store temporal information that causes the data store 110 to utilize the correct state based on the timing of the request. That is, the first mobile device 102 requests the item information during the nonevent (i.e., a day of the week other than Friday) and the data store 110 provides the nonevent state 112 to the first mobile device 102. Accordingly, the first mobile device 102 presents the nonevent item information 104. By contrast, the second mobile device 114 requests the item information during the event (i.e., on a Friday) and the data store 110 provides the event state 122 to the second mobile device 114. Accordingly, the second mobile device 114 presents the event item information 116.

In addition to avoiding backend calls when customers request item information, such a system enables the immediate provision of item information to customers at the time of an event. As previously discussed, item information is typically cached. When an event begins, the item information in the cache is outdated. For example, if the price for an item changes at 9:00P (i.e., goes on sale at 9:00 P), the item information in the cache will not reflect the current price. Rather, the item information in the cache will reflect the non-sale price. In order for the cache to include the current pricing information, the cache must be flushed. Typically, the cache is flushed when a customer requests the item information and the item information is stale. When the webserver receives the request, it determines that the item information in the cache is outdated and makes the appropriate backend calls to update the item information. While this is happening, the cache still reflects the non-sale price. Consequently, until the backend calls are completed and the new item information is computed, customers will be presented with the non-sale price. This creates a lag between when the sale event begins and the item information correctly reflects the sale price. This problem is further compounded for websites that are reachable across jurisdiction (e.g., websites that are accessible throughout the world). For such websites, caches all over the world must be updated. Typically changes in one cache are propagated to the other caches, increases this lag. The pregeneration of states for nonevents and events can prevent, or at least minimize, this lag. Because the cache is populated with multiple state, the cache is never stale. That is, in the described system, because the nonevent states 112 and the event states 122 are both stored in the data store 110 before the event begins, this lag can be minimized, if not eliminated.

Though the example depicted in FIG. 1 includes only two sets of states (i.e., the nonevent states 112 and the event states 122), embodiments are not so limited. In some embodiments, the data store 110 can include more than two sets of states (i.e., any number of states as desired). For example, the data store 110 can include three sets of states: 1) a set of states before the event begins, 2) a set of states for during the event, and 3) a set of states for after the event. Additionally, though the example of FIG. 1 refers to the price of an item varying, embodiments are not so limited, and the selection of states can be based on any suitable variable. For example, assume that product availability is based on a lottery system. In this case, users requesting an item may be randomly selected to purchase or receive the item. When a request is received, if the user has been randomly selected to purchase or receive the item, the event state 122 can be provided to the customer. If the customer was not randomly selected to purchase or receive the product, the nonevent state 112 can be provided to the customer.

Figure 2:
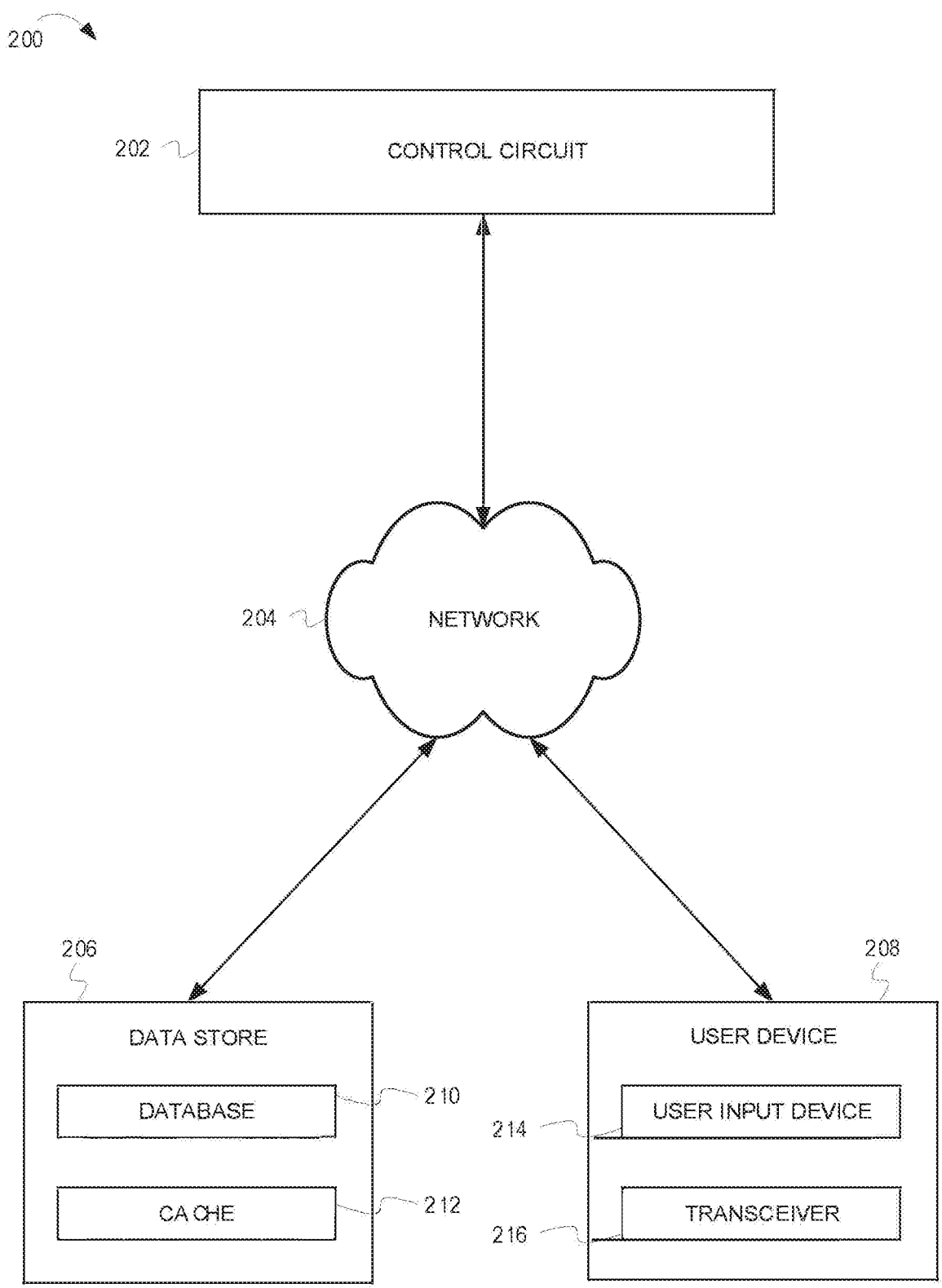
FIG. 2 depicts a system 200 for providing item information to customers in an online retail environment, according to some embodiments.

While the discussion of FIG. 1 provides an overview of pregenerating states for items, the discussion of FIG. 2 provides additional detail regarding such a system.

FIG. 2 depicts a system 200 for providing item information to customers in an online retail environment, according to some embodiments. The system 200 includes a control circuit 202, a data store 206, and a user device 208. One or more of the control circuit 202, the data store 206, and the user device 208 are communicatively coupled via the network 204. Accordingly, the network 204 can be of any suitable type. For example, the network 204 can include a local area network (LAN) and/or a wide area network (WAN), such as the Internet. The network 204 can include wired and/or wireless links.

The user device 208 is operated by a user, such as a customer or retail employee. Accordingly, the user device 208 can be of any suitable type. For example, the user device 208 can be a computer (e.g., a desktop or laptop computer), a mobile device (e.g., a smartphone or tablet), an automotive infotainment system, a kiosk, a point-of-sale (POS) terminal, etc. The user device 208 includes a user input device 214. The user input device 214 can be of any suitable type, dependent upon the type of the user device 208. For example, the user input device can be a touchscreen, a keyboard, a trackpad, a mouse, a stylus, etc. The user input device 214 receives user input to select items from the online retail environment. The user device 208 allows the user to access an online retail environment, such as a retailer's website. The user device 208 receives item information associated with the retailer's website and allows the customer to purchase items via the retailer's website. Accordingly, the user device 208 includes a transceiver 216. The transceiver 216 is configured to transmit indications of selected items and receive item information associated with selected items. The transceiver 216 can be of any suitable type, dependent upon the type of the user device 208. For example, the transceiver can be a wireless radio (e.g., a wireless wide area network (WWAN) radio, a network adapter, etc.) and/or a wired radio.

The control circuit 202 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. The control circuit 202 is configured (for example, by using corresponding programming as will be well understood by those skilled in the art) to carry out one or more of the steps, actions, and/or functions described herein.

By one optional approach the control circuit 202 operably couples to a memory. The memory may be integral to the control circuit 202 or can be physically discrete (in whole or in part) from the control circuit 202 as desired. This memory can also be local with respect to the control circuit 202 (where, for example, both share a common circuit board, chassis, power supply, and/or housing) or can be partially or wholly remote with respect to the control circuit 202 (where, for example, the memory is physically located in another facility, metropolitan area, or even country as compared to the control circuit 202).

This memory can serve, for example, to non-transitorily store the computer instructions that, when executed by the control circuit 202, cause the control circuit 202 to behave as described herein. As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).

The control circuit 202 can be associated with, or resident on, a webserver and multiple backend systems. The control circuit 202 pregenerates states of items. The states of items are based on item information obtained from various back-end systems (e.g., pricing systems, inventory systems, etc.). The states are provided to the user device 208 to present the item information to the customer via the user device 208. The control circuit 208 pregenerated the states of the items in the that the states of the items are generated before the item information is requested. The control circuit 202 pregenerates states of the items for multiple different circumstances. For example, the control circuit 202 can pregenerate states of items for multiple future events and nonevents (e.g., a nonevent price, an $Event_1$ price, and an $Event_2$ price, such that the price can change easily from the nonevent price, to the $Event_1$ price, to the $Event_2$ price, and back to the nonevent price at the end of the event(s)). The states of the items are stored in the data store 206. In some embodiments, the control circuit 202 includes multiple layers, each being responsible for different tasks. For example, in one embodiment, the control circuit 202 includes an ingestion layer. The ingestion layer pregenerates the states of the items.

The data store 206 stores the states of the items. The data store stores multiple sets of states of the items. For example, if a promotional event is upcoming, the data store 206 stores states for the items before the event (i.e., nonevent states) and states for the items during the event (i.e., event states). The data store 206 can store as many sets of states as desired.

In some embodiments, the data store 206 includes a database 210 and a cache 212. The database 210 can be of any suitable type (e.g., a relational database, a NoSQL database, etc.) and can, in some embodiments, store real time data (i.e., a real time database). In embodiments in which the data store 206 includes a cache 212, the data store 206 can store the states in the cache 212. That is, the data store 206 caches the states so that they are easily accessible upon request. The data store 206 also stores trigger conditions for the states. The trigger conditions indicate which state should be utilized to provide item information to customers. In one embodiment, the trigger conditions are included in the states. The trigger conditions can be, for include, for example, temporal information.

As previously discussed, in some embodiments, the control circuit 202 includes multiple layers. In one embodiment, the control circuit 202 includes a push layer. The push layer pushes the pregenerated states of the items to the user device 208. That is, instead of waiting for a request for item information, the control circuit 202, via the push layer, provides the user device 208 with the pregenerated states. In one embodiment, the push layer provides the user device 208 with the pregenerated states during low traffic periods, such as before an event begins.

If the user device 208 includes sufficient local storage (e.g., a mobile device, such as a smartphone, a tablet, etc.), the user device 208 can store local copies of the pregenerated states, much like the data store 206. Because the user device 208 can store local copies of the pregenerated states, the number of requests for the pregenerated states from the backend is minimized. That is, if the user device 208 includes local copies of the pregenerated states, when a user, via the user device 208, selects an item, the user device 208 can provide the item information based on the pregenerated states stored locally. This can further decrease traffic during peak periods, such as at the beginning of an event.

In addition to the ingestion layer and the push layer, in some embodiments, the control circuit 202 includes a pull layer. The pull layer provides item information to user devices that do not have sufficient local storage or memory to store local copies of the pregenerated states. For example, if the user device 208 is a laptop computer executing a web browser, the web browser may not have access to sufficient memory to store the pregenerated states. That is, though the laptop computer may have a significant hard drive and/or random access memory (RAM) capacity, the amount of storage space allotted to the web browser is relatively small. In such embodiments, the push layer provides the user device 208 (i.e., the laptop computer in this example) upon request, as described herein.

Figure 3:
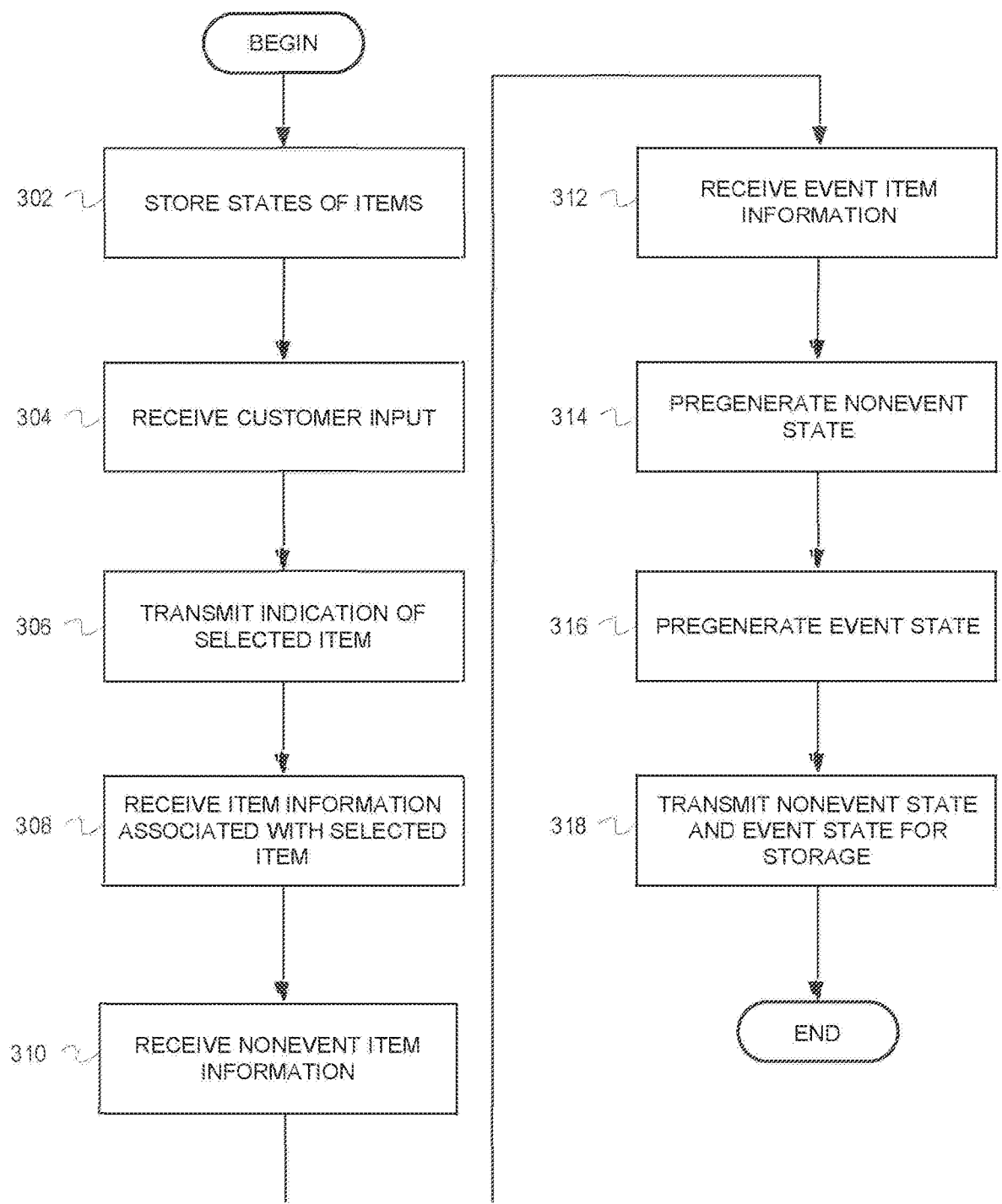
FIG. 3 is a flowchart depicting example operations for providing item information to customers in an online retail environment, according to some embodiments.

While the discussion of FIG. 2 provides additional detail regarding providing item information to customers in an online retail environment, the discussion of FIG. 3 describes example operations for providing item information to customers in an online retail environment.

FIG. 3 is a flowchart depicting example operations for providing item information to customers in an online retail environment, according to some embodiments. FIG. 3 depicts operations at stages 302-318. The operations are examples and are not necessarily discrete occurrences over time (e.g., the operations of different stages may overlap). Additionally, the operations may occur in a sequence other than that presented. Additionally, FIG. 3 is an overview of example operations. The flow begins at block 302.

At block 302, states of items are stored. For example, the states of items can be stored in a data store. The states of the items include the item information that is necessary to present the item on a user's device. The data store can include a database and/or cache. In some embodiments, the data store caches the states of the items for prompt retrieval. Such caching can avoid overloading the website and/or provide updated pricing to be reflected instantaneously, or almost instantaneously, when a promotion begins. The data store stores multiple states for items. For example, the data store can include two states for a single item. The first state for the item can be a nonevent state and the second state for the item can be the nonevent state. In some embodiments, the multiple states for single items are stored simultaneously. The flow continues at block 304.

At block 304, customer input is received. For example, the customer input can be received by a user device. The customer input selects items. That is, while the customer is shopping, he or she can select items to view on his or her mobile device. The customer input is received via a user input device of the user device. The item selected by the customer is a "selected item." The flow continues at block 306.

At block 306, an indication of the selected item is transmitted. For example, the user device can transmit the indication of the selected item to the control circuit. The control circuit receives the indication of the selected item and, in turn, retrieves a state for the selected item from the data store. The flow continues at block 308.

At block 308, item information associated with the selected item is received. For example, a user device, via a transceiver, can receive the item information associated with the selected item. The user device receives the item information for the selected item from the control circuit. The item information is based on the state of the item retrieved by the control circuit from the data store. The flow continues at block 310.

At block 310, nonevent item information is received. For example, the control circuit can receive the nonevent item information. The nonevent item information is received from backend systems (e.g., pricing data store, an inventory data store, an item file data store, etc.). The nonevent item information is item information for the item when an event is not occurring. For example, the nonevent item information can include a nonevent price (e.g., pricing associated with a nonevent for the item), nonevent inventory, nonevent availability, etc. The flow continues at block 312.

At block 312, event item information is received. For example, the control circuit can receive the event item information. The event item information is received from backend systems (e.g., pricing data store, an inventory data store, an item file data store, etc.). The event item information is item information for the item when an event is occurring. For example, the event item information can include an event price (e.g., pricing associated with the event for the item), item inventory, item availability, etc. Additionally, in some embodiments, the event item information includes temporal information associated with the event (e.g., a start and/or end of the event). The flow continues at block 314.

At block 314, a nonevent state is pregenerated. For example, the control circuit can pregenerate the nonevent state for the item. The nonevent state for the item is based on the nonevent item information. That is, the nonevent state for the item reflects the nonevent details of the item (e.g., the "regular" price of the item, the nonevent availability of the item, etc.). The nonevent state for the item includes the data necessary to present the nonevent item information to a customer, for example, via a user device. The nonevent state is pregenerated in that it is generated before a request is made for the item information. Additionally, in some embodiments, the nonevent state for the item is pregenerated in that it is generated before the event begins. The flow continues at block 316.

At block 316, an event state is pregenerated. For example, the control circuit can pregenerate the event state for the item. The event state for the item is based on the event item information. That is, the event state for the item reflects the event details of the item (e.g., the sale price of the item, event availability for the item, item availability for the event, etc.). The event state for the item includes the data necessary to present the event item information to a customer, for example, via a user device. The event state is pregenerated in that it is generated before a request is made for the item information. Additionally, in some embodiments, the event state for the item is pregenerated in that it is generated before the event begins. In some embodiments, the control circuit can pregenerate event states for all items for which the item information will change during the event. The flow continues at block 318.

At block 318, the nonevent state and the event state are transmitted for storage. For example, the control circuit can transmit the nonevent state and the event state for storage in the data store. As previously discussed, the data store can store nonevent states and event states for multiple items simultaneously. In some embodiments, the data store stores temporal information associated with the nonevent and/or event states. For example, the data store can include the date and/or time on which an event begins. When the control circuit retrieves the states, the control circuit retrieves either the nonevent state or one of the possibly multiple event states based on the temporal information.

In some embodiments, a system for providing item information to customers in an online retail environment comprises a data store, wherein the data store is configured to store states of items, wherein the items are offered for sale online, a user device, wherein the user device comprises a user input device, wherein the user input device is configured to receive customer input to select a selected item, and a transceiver, wherein the transceiver is configured to transmit an indication of the selected item and receive item information associated with the selected item, and a control circuit, wherein the control circuit is communicatively coupled to the data store and the user device, and wherein the control circuit is configured to receive, from backend systems, nonevent item information for a first item, wherein the nonevent item information includes pricing associated with a nonevent for the first item, receive from the backend systems, event item information for the first item, wherein the event item information includes pricing information associated with an event for the first item and temporal information associated with the event, pregenerate, based on the nonevent item information, a nonevent state of the first item, pregenerate, based on the event item information, an event state of the first time, and transmit, for storage in the data store, the nonevent state of the first item and event state of the first item.

In some embodiments, an apparatus and a corresponding method performed by the apparatus comprises storing, in a data store, states of items, wherein the items are offered for sale online, receiving, at a user input device of a user device, customer input to select a selected item, transmitting, by a transceiver of the user device, an indication of the selected item, receiving, by the transceiver of the use device, item information associated with the selected item, receiving, by a control circuit from backed systems, nonevent item information for a first item, wherein the nonevent information includes pricing associated with a nonevent for the first item, receiving, by the control circuit from the backend systems, event item information for the first item, wherein the event item information includes pricing associated with an event for the first item and temporal information associated with the event, pregenerating, by the control circuit based on the nonevent item information, a nonevent state of the first item, pregenerating, by the control circuit based on the event item information, an event state of the first item, and transmitting, by the control circuit for storage in the data store, the nonevent state of the first item and event state of the first item.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for providing item information to customers in an online retail environment, the system comprising:
   a data store including a database and a cache, wherein the data store in configured to store states of items, wherein the items are offered for sale online; and
   a control circuit, wherein the control circuit is communicatively coupled to the data store, and wherein the control circuit is configured to:
   receive, from a backend system, nonevent item information for a first item, wherein the nonevent item information includes pricing associated with a nonevent for the first item;
   receive, from the backend system, event item information for the first item, wherein the event item information includes pricing associated with an event for the first item, trigger condition associated with the event, and temporal information associated with the event;
   pregenerate, based on the nonevent item information, a nonevent state of the first item including the pricing associated with the nonevent for the first item;
   pregenerate, based on the event item information, an event state of the first item including the pricing associated with the event for the first item, wherein the event state of the first item becomes valid at a time corresponding to the temporal information associated with the event and based on the trigger condition being met;
   transmit, for storage in the cache of the data store, the pregenerated nonevent state of the first item and the pregenerated event state of the first item, wherein the pregenerated nonevent state of the first item and the pregenerated event state of the first item are stored in the cache and both the nonevent state of the first item and the event state of the first item are simultaneously present in the cache before the event begins;
   push, based on online traffic being low, the states of the items to a user device for local storage on the user device;
   determine whether the user device has sufficient storage space to store the states of the items; and
   based on determining that the user device does not have sufficient storage space to store the states of the items, retrieve one of the nonevent state and the event state of the first item from the cache upon a selection of the first item.

2. The system of claim 1, wherein an indication of time associated with a selection of the first item is outside of a window for the event, and wherein the control circuit retrieves the nonevent state of the first item.

3. The system of claim 1, wherein an indication of time associated with a selection of the first item is within a window for the event, and wherein the control circuit retrieves the event state of the first item.

4. The system of claim 1, wherein the database includes a real time database.

5. The system of claim 1, wherein the control circuit includes an ingestion layer, and wherein the ingestion layer pregenerates the states of the items.

6. The system of claim 1, wherein the control circuit includes a push layer, and wherein the push layer pushes the states of the items to a mobile device.

7. The system of claim 1, wherein, in response to an initial selection of the first item, the control circuit is configured to retrieve one of the nonevent state of the first item and the event state of the first item from the cache without making any calls to the backend system.

8. The system of claim 1, wherein the control circuit is further configured to:
receive, from the user device via an online shopping interface, an initial selection of the first item and an indication of a time associated with the initial selection of the first item.

9. The system of claim 8, wherein the control circuit is further configured to:
determine, based on the indication of the time associated with selection of the first item and the temporal information associated with the event, one of the nonevent state of the first item and the event state of the first item.

10. The system of claim 1, wherein the trigger condition indicates which of the event state and the nonevent state should be utilized to provide the item information, and wherein the trigger condition comprises a user associated with the user device being randomly selected for the event based on a lottery.

11. A method for providing item information to customers in an online retail environment, the method comprising:
storing, in a data store including a database and a cache, states of items, wherein the items are offered for sale online;
receiving, by a control circuit from a backend system, nonevent item information for a first item, wherein the nonevent item information includes pricing associated with a nonevent for the first item;
receiving, by the control circuit from the backend system, event item information for the first item, wherein the event item information includes pricing associated with an event for the first item, trigger condition associated with the event, and temporal information associated with the event;
pregenerating, by the control circuit based on the nonevent item information, a nonevent state of the first item including the pricing associated with the nonevent for the first item;
pregenerate, by the control circuit based on the event item information, an event state of the first item including the pricing associated with the event for the first item, wherein the event state of the first item becomes valid at a time corresponding to the temporal information associated with the event and based on the trigger condition being met;
transmitting, by the control circuit for storage in the cache of the data store, the pregenerated nonevent state of the first item and the pregenerated event state of the first item;
storing, in the cache before the event begins, the pregenerated nonevent state of the first item and the pregenerated event state of the first item, wherein both the nonevent state of the first item and the event state of the first item are simultaneously present in the cache before the event begins;
pushing, by the control circuit based on online traffic being low, the states of the items to a user device for local storage on the user device;
determining whether the user device has sufficient storage space to store the states of the items; and
based on determining that the user device does not have sufficient storage space to store the states of the items, retrieving one of the nonevent state and the event state of the first item from the cache upon a selection of the first item.

12. The method of claim 11, wherein an indication of time associated with a selection of the first item is outside of a window for the event, and wherein the control circuit retrieves the nonevent state of the first item.

13. The method of claim 11, wherein an indication of time associated with a selection of the first item is within a window for the event, and wherein the control circuit retrieves the event state of the first item.

14. The method of claim 11, wherein the database includes a real time database.

15. The method of claim 11, wherein the control circuit includes an ingestion layer, and wherein the ingestion layer pregenerates the states of the items.

16. The method of claim 11, wherein the control circuit includes a push layer, and wherein the push layer pushes the states of the items to a mobile device.

17. The method of claim 11, wherein the trigger condition indicates which of the event state and the nonevent state should be utilized to provide the item information, and wherein the trigger condition comprises a user associated with the user device being randomly selected for the event based on a lottery.

\* \* \* \* \*